United States Patent Office 3,700,627
Patented Oct. 24, 1972

3,700,627
DECOLORIZED POLYTETRAFLUOROETHYLENE
Henry C. Miller, Hatfield, Pa., assignor to Pennwalt
Corporation, Philadelphia, Pa.
No Drawing. Filed May 25, 1970, Ser. No. 40,386
Int. Cl. C08f 45/56
U.S. Cl. 260—45.85                                    1 Claim

ABSTRACT OF THE DISCLOSURE

Polytetrafluoroethylene film free of color is produced by adding metal salts to an aqueous polytetrafluoroethylene dispersion containing hydrocarbon surfactants, casting a film from the latex and sintering the film in air. The salts are added in 5 to 300 parts per million based on the weight of the latex.

BACKGROUND OF THE INVENTION

Field of the invention

This invention relates to production of improved fluorine-containing polymer coatings and more particularly to a process for producing sintered polytetrafluoroethylene film or coatings of improved color and to products useful for the preparation of said sintered polytetrafluoroethylene.

Description of the prior art

Coating of substrates with polytetrafluoroethylene (hereafter abbreviated PTFE) is an established process utilized to prepare a large number of coated articles. Among the substrates coated are metal cooking utensils, U.S. Pat. No. 3,008,601, plain wire and ceramic coated wire, U.S. Pat. No. 2,919,213. Other articles known to be coated with PTFE are tools and ceramic cooking utensils. Cast films of PTFE have also been prepared as in U.S. Pat. No. 2,852,811.

The coating process requires dipping, spraying or painting an aqueous PTFE dispersion or latex onto the substrate and heating the resulting film to remove volatile matter, mainly water, and to fuse the PTFE resin. The PTFE latex obtained by polymerization of tetrafluoroethylene must be modified in order to obtain good flow characteristics and high solids content for coatings. Modification is accomplished by concentrating or creaming the latex to increase the solids content as shown in U.S. Pat. No. 3,301,807. The concentration process requires the addition of more hydrocarbon surfactant to the PTFE latex. Discoloration results from decomposition of this added organic ingredient and other matter already present in the latex during sintering at minimum sintering temperature of 327° C. The PTFE may itself contain sites which are thermally unstable and thereby add to the total discoloration. Both the amount and type of surfactant employed may vary. The PTFE latex may contain from 6 to 20% of hydrocarbon surfactant, U.S. Pat. No. 3,301,807. Onionic, cationic and non-ionic surfactants are used as dispersing agents for PTFE latexes.

Several processes which appear to involve a bleaching step have been employed on powdered PTFE freed of hydrocarbon surfactant to obtain molded PTFE that is free from color. For example, PTFE powder has been heated to temperatures of about 350° to 425° C. in the presence of oxygen, chlorine, bromine, nitrogen, trioxide, nitrogen dioxide, nitric acid, etc. Another process involves refluxing the polymer with a mixture of water, soluble carboxylic acid and a water soluble inorganic oxidizing agent for from about 1 to 24 hours. However, these processes all involve powdered PTFE washed free of all organic ingredients, including the surfactant, prior to exposing the solid resin to heat.

A number of metallic compounds are reported which either prevent or bleach discoloration during sintering of PTFE moldings. The metallic compounds are salts of oxyhalo acids, e.g. chloric and perchloric, which liberate oxygen during the sintering step U.S. Pat. No. 3,190,864. PTFE powder is coated with a solution of the salts of these acids, dried and then molded into a preform which must be sintered. During sintering, the salts decompose to yield oxygen which either inhibits discoloration or removes it by bleaching.

Another inorganic additive advanced as a catalyst for oxidative bleaching of PTFE is a copper salt of fluoroboric acid. It is said to be selective over nickel fluoroborates (U.S. Pat. No. 3,328,343).

Another expedient described has been to include certain metal salts that stabilize PTFE from greying or yellowing. These salts are stated to be stable at temperatures above 400° C., i.e. they do not liberate oxygen, and include calcium, strontium, barium, lead and potassium nitrates, barium chlorate and barium perchlorate (U.S. Pat. No. 3,419,522).

None of these processes are suitable for PTFE films cast directly from a latex because they all involve PTFE that has been isolated from its dispersions and the sintering steps and other treatment are done in the absence of hydrocarbon surfactant.

SUMMARY OF THE INVENTION

This invention involves a process for preparing a PTFE film or coating from a PTFE latex containing 30 to 60 percent by weight of PTFE, 1 to 15 percent by weight of a hydrocarbon surfactant and 5 to about 300 parts per million by weight, based on the total weight of the latex, of a water soluble metal salt selected from the group consisting of alkali metal salts, alkaline earth metal salts, lead acetate and zinc chloride, wherein a cast film of the latex is heated to a sintering temperature, in the presence of air or oxygen. The color of the sintered film prepared using this process is considerably reduced over films prepared in the absence of the added salts. The color observed in the unprotected polymer is generally light yellow to dark brown. The resulting film may be either a PTFE coating on a metal, glass or ceramic substrate or may be stripped away from the substrate to yield a self supporting film of PTFE.

Compositions also within the invention are the latex having 5 to 300 parts per million of the added salts and films prepared by the process.

DESCRIPTION OF THE PREFERRED EMBODIMENTS

Examples

In the following tables, the data are based on results observed after adding the indicated amount of metal salt to a PTFE latex, casting a latex film on a substrate evaporating the water phase and other volatile matter and sintering the residue at 380° C. for an hour. The substrate is glass or aluminum. The amount of salt added in Table 1 is given in parts per million (p.p.m.) based on the weight of salt added to the total weight of the latex. The amount of salt, in p.p.m., present after removal of the water will, therefore, be a function of the amount of solids in the latex. For example; a film prepared from a latex having 60 percent polymer solids and to which 10 p.p.m. of sodium chloride is added, will have approximately 17 p.p.m. of sodium chloride in the final film. If the latex contains 30 percent polymer, the amount of metal salt in p.p.m. present after water is removed will be even higher. Table 2 shows the relative effectiveness of metal ions when they are used in amounts proportional to their atomic weight.

The latex used in these examples may be prepared and concentrated by conventional techniques such as those reported in U.S. Patents 3,037,953; 3,301,807 and 3,316,201 and may contain from 6 to 60 percent by weight of PTFE, however, the amount of PTFE solids present in the latex is not critical.

The pH of the latex was adjusted to be high, around 10, by adding ammonium hydroxide to the PTFE latex prior to adding the salts. However, adjustment of the pH is not essential.

The latex used in these examples contains about 60 percent PTFE and is stabilized against coagulation with one to fifteen percent of an added surfactant which is a non-ionic surfactant. These examples were carried out using an octylphenoxy polyethoxy ethanol formed from ethylene oxide and octylphenol and containing a chain of about 9 to 10 oxyethylene groups. These surfactants are sold commercially under the trademark Triton X 100 or Igepal. In the examples which follow the latex is coated onto a glass disk and sintered at 380° C. for 10 minutes.

TABLE 1.—EFFECT OF METAL SALTS ON THE COLOR OF SINTERED POLYTETRAFLUOROETHYLENE FILM

| Example number: | P.p.m. of salt | Salt | Film color after sintering at 380° C./10 minutes |
|---|---|---|---|
| 1 | 0 | | Dark brown. |
| 2 | 0 | | Very dark brown. |
| 3 | 10 | $LiNO_3$ | Dark brown. |
| 4 | 30 | $LiNO_3$ | Light brown. |
| 5 | 100 | $LiNO_3$ | White. |
| 6 | 30 | $Ba(NO_3)_2$ | Brown. |
| 7 | 150 | $Ba(NO_3)_2$ | White. |
| 8 | 10 | NaCl | Mottled brown. |
| 9 | 40 | NaCl | Off white. |

TABLE 2.—EFFECT OF THE METAL SALT CATION ON THE COLOR OF PTFE FILMS AFTER SINTERING FOR 10 MINUTES AT 380° C.

| Example No. | P.p.m. of metal cation | Result |
|---|---|---|
| 10 | $23Na^+$ as NaCl | Very light brown broken ring near edge, white center. |
| 11 | $38K$ as KCl | Off white. |
| 12 | $40Ca^{++}$ as $CaCl_2$ | Mottled dark brown. |
| 13 | $23Na^+$ as NaF | Off white in center, light brown at edges. |
| 14 | $39K$ as KF | Do. |
| 15 | $40Ca^{++}$ as $Ca(Ac)_2$* | Mottled dark brown. |
| 16 | $65Zn^{++}$ as $ZnCl_2$ | Narrow brown band near edge. |
| 17 | $137Ba^{++}$ as $BaCl_2$ | White. |
| 18 | $68Ba^{++}$ as $BaCl_2$ | White in center, broad brown band at edge. |
| 19 | $23Na^+$ as NaAc* | Spotted narrow band near edge, white center. |
| 20 | $16Na^+$ as NaAc* | Broad light brown band near edge. |
| 21 | $207Pb^{++}$ as $Pb(Ac)_2$* | White spotted. |
| 22 | $7Li^+$ as LiCl | Broad band at edge. |

*Ac represents the acetate radical.

Films prepared on aluminum foil were comparable to those on glass, although the opacity of the aluminum foil causes the film to have a slightly more intense discolor or whiteness.

Table I shows the effect on the sintered color of the film by adding varying amounts of metal salts to the latex prior to sintering. Table 2 shows that the metal cations appear to be effective when present in amounts proportional to their atomic weight, e.g. the atomic weight of sodium is about 23, and the presence of 23 p.p.m. of $Na^+$ in the latex appears to be effective. This generalization is convenient for determining how much metal ion should be added although in some cases more or less than this amount may be needed.

No effect was noted from the anion of the metal salts. For example, sodium chloride, sodium acetate and sodium fluoride all appear to be equally effective.

The invention is useful in the production of PTFE coatings on a wide variety of substrates, e.g. metal cooking utensils of aluminum or steel, ceramic or glass objects, metal shovels, saws, etc. The resultant coating after sintering may be left on the substrate or may be stripped off to form PTFE film.

The salts utilized in this invention include the water soluble salts of lead, zinc, alkali metals and of alkaline earth metals. The requirement that the metal salts be water soluble is important for best dispersion throughout the latex. The term "water soluble salts" has the same meaning given in common chemical handbook references.

The effect of the metal salts described herein are particularly surprising in view of British Patent 1,030,567 which discloses that the presence of metal ions in PTFE moldings can cause discoloration on sintering. The salts disclosed herein appear to function as a catalyst for oxygen bleaching of the hydrocarbon surfactant and other organic matter present.

The sintering step is carried out in an air oven. If desired, oxygen in addition can be passed over the surface of the polymer during the sintering step; however, oxygen in the air is adequate to produce coatings which are colorless. If the sintering step is conducted in a vacuum or in an inert atmosphere, e.g. nitrogen atmosphere, the coating is discolored. Thus, heating the polymer residue after removal of water must be done in the presence of air or oxygen.

The sintering step is usually completed in less than an hour when cast films are sintered at 380° C. If sufficient metal salt is added, colorless PTFE is obtained. When the amount of salt added is too small, some color will accompany the sintering step. Then, the heating step must be prolonged in order to eliminate the color.

Sodium chloride is particularly effective in preventing the onset of color during the sintering step. Lithium nitrate was also found effective to inhibit the onset of color, but was required in larger amounts than was sodium chloride. However, when equivalent amounts of the metal ion are used, based on gram formula weights, lithium is as effective as sodium. Barium nitrate when used in proper amounts was also very effective. This is shown in Table 1. Sodium chloride is preferred, however, because it is readily available and inexpensive.

What is claimed is:

1. A composition comprising polytetrafluoroethylene prepared by adding to an aqueous polytetrafluoroethylene latex 5 to 300 parts per million by weight of a water soluble metal salt selected from the group consisting of sodium chloride, sodium fluoride, and sodium acetate, evaporating the water from the said latex, and heating the resultant polytetrafluoroethylene at a sintering temperature of about 380° C. in the presence of oxygen.

References Cited

UNITED STATES PATENTS

| 3,037,953 | 6/1962 | Marks | 260—29.6 |
| 3,154,519 | 10/1964 | Iserson | 260—29.6 |
| 3,190,864 | 6/1965 | Shipp | 260—92.1 |
| 3,301,807 | 1/1967 | Hoashi | 260—29.6 |
| 3,328,343 | 6/1967 | Dollman | 260—92.1 |
| 3,419,522 | 12/1968 | Plimmer | 260—45.75 |
| 3,438,934 | 4/1969 | Reinhardt | 260—45.75 |

DONALD E. CZAJA, Primary Examiner

V. P. HOKE, Assistant Examiner

U.S. Cl. X.R.

260—29.6 F, 45.7 R, 45.75 R, 45.9 R; 264—127